INVENTOR.
H. W. ORR

INVENTOR.
H. W. ORR

United States Patent Office 3,111,460
Patented Nov. 19, 1963

3,111,460
METHOD OF AND APPARATUS FOR CONTROL-
LING A FLUID SEPARATION PROCESS
Harold W. Orr, Borger, Tex., assignor to Phillips Petroleum Company, a corporation of Delaware
Filed Oct. 31, 1960, Ser. No. 66,175
14 Claims. (Cl. 202—40)

This invention relates to an improved method of and apparatus for controlling the separation of a volatile fluid from a relatively non-volatile liquid. In one specific aspect, this invention relates to a method of and apparatus for controlling a process wherein a previously absorbed volatile fluid is separated from an absorption liquid.

This invention will be described in detail as applied to absorption processes where, perhaps, it finds its greatest application. It is not intended, however, that the invention be limited thereto, as it will be readily apparent to those skilled in the art that the control method herein disclosed can be applied to any process wherein a volatile fluid is to be separated from a nonvolatile liquid.

In an absorption process wherein furfural, for example, is employed to absorb butylene or butadiene from a process stream, it is desirable to strip the butylene or butadiene from the furfural and recycle the furfural to the absorption step. In order that the absorption process be operated at maximum efficiency, it is necessary that the rich furfural be stripped to the optimum level. The efficiency of the absorption step is decreased if the stripping operation is insufficient and an excessive amount of polymerization occurs if the furfural is stripped beyond the optimum level. In the described process, therefore, and in similar processes wherein a volatile fluid is separated from a relatively non-volatile liquid, it is important that the separation or stripping process step be closely controlled.

Accordingly, an object of this invention is to provide an improved method of and apparatus for controlling the separation of a volatile fluid from a relatively non-volatile liquid.

Another object of this invention is to provide an improved method of and apparatus for controlling the separation of a previously absorbed volatile fluid from an absorption liquid.

Other objects, advantages and features of my invention will be readily apparent to those skilled in the art from the following description and the appended claims.

Broadly, I have discovered that the separation by distillation of a volatile fluid and a relatively non-volatile liquid can be effectively controlled by determining the concentration of volatile fluid in the separated non-volatile liquid and adjusting the temperature of the distillation zone, the distillation zone pressure, or the flow of feed to the distillation zone in response to said concentration. The concentration of volatile fluid in the separated relatively non-volatile liquid is determined by passing a carrier or contacting gas through a sample portion of said separated relatively non-violatile liquid and measuring a property of the effluent gas emitted from the contact zone which is representative of the composition thereof.

Figure 1:
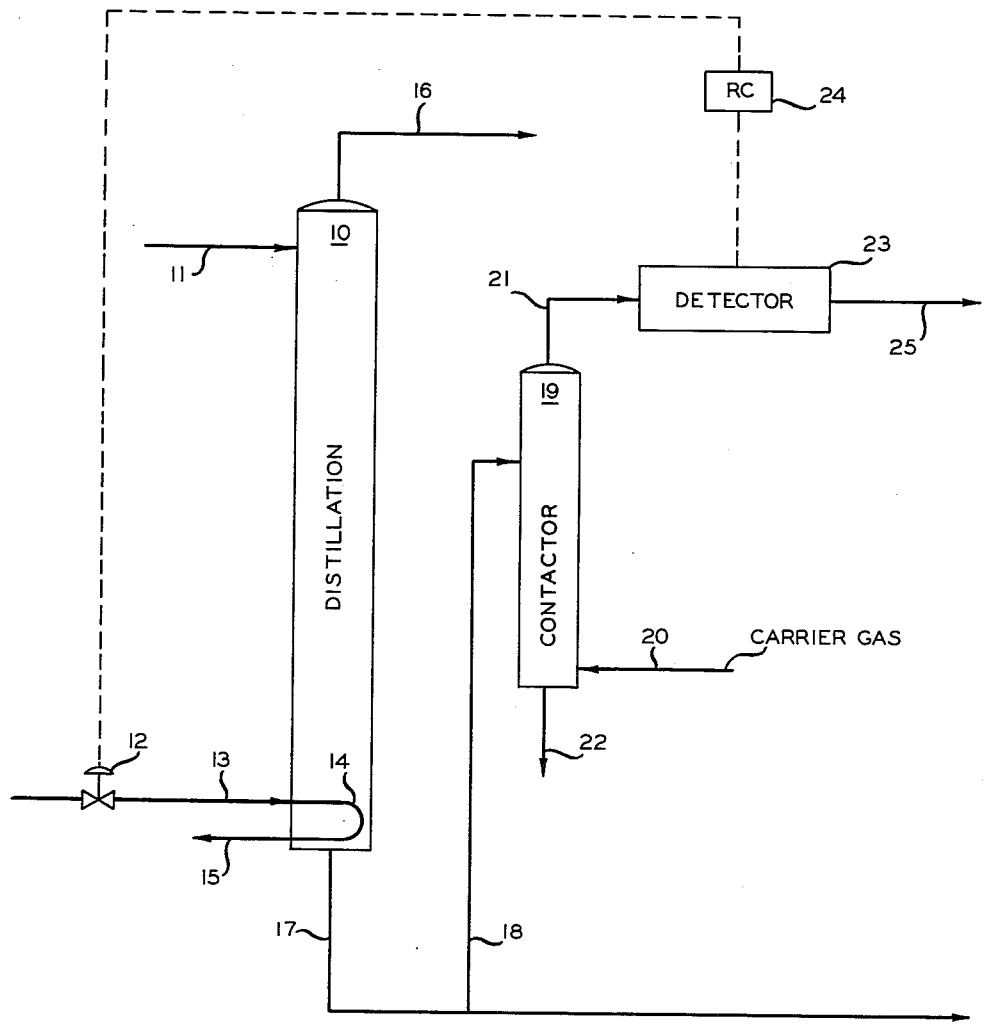
FIGURE 1 is a schematic diagram of a preferred embodiment of the inventive control method.

Referring to FIGURE 1, a relatively non-volatile liquid containing a volatile fluid is introduced into a distillation column 10 via conduit 11. A heat exchange means 14 is positioned in the lower region of column 10. A heating medium, such as steam, is passed to said heat exchange means 14 via control valve 12 and conduit 13 and removed via conduit 15. A volatile fluid stream is removed from column 10 via conduit 16. A relatively non-volatile liquid stream is removed from column 10 via conduit 17.

A portion of the relatively non-volatile withdrawn liquid stream is introduced via conduit 18 into the upper region of a contact column 19. A relatively non-volatile liquid stream is passed from contact column 19 via conduit 22. A carrier or contacting gas is passed to the lower region of column 19 via conduit 20. A gaseous overhead stream is removed from column 19 via conduit 21 and passed to a detector 23.

Detector 23 is adapted to measure a property of the gaseous overhead stream directed thereto, which property is representative of the composition of the gaseous mixture. The detector can be a thermal conductivity cell which includes a temperature sensitive resistance element disposed in the path of gaseous flow from column 19. A reference element, not shown can be disposed in the carrier gas flow to column 19. Such a detector provides signals representative of a difference in thermal conductivity in the column effluent and the carrier gas. The temperature differences between the resistance elements can be measured by electrical bridge circuits, such as a Wheatstone bridge. However, the detector can also be any other type of apparatus known in the art capable of measuring a property of a gaseous stream.

The output signal of detector 23 is transmitted to a recorder controller 24, which in response to said output signal operates to open or close control valve 12. An effluent gaseous stream is removed from detector 23 via conduit 25.

In practicing the inventive control method, a sample feed stream is continuously withdrawn via conduit 18 and passed to contact column 19 maintained at a constant temperature by a method not herein illustrated. An inert carrier gas, such as helium, is passed to column 19 at a constant temperature.

In operating column 19 at a constant temperature, the concentration of volatile fluid in the carrier gas stream flowing from column 19 is in direct proportion to the concentration of the volatile fluid in the non-volatile liquid stream removed from column 10. A unique feature of this control method is that it is not necessary that the carrier or contact gas remove all of the volatile fluid from the feed stream to column 19.

Detector 23 thus serves as a monitor in the maintenance of a constant stripping operation in column 10. A deviation from a previously determined value, as measured by detector 23, causes recorder controller 24 to operate valve 12 in response thereto. With an increase in concentration of a volatile fluid in the carrier gas stream flowing from column 19 as determined by detector 23, recorder controller 24 causes valve 12 to open so as to increase the flow of heat to column 10. A decrease in the concentration of volatile fluid in the carrier gas stream flowing from column 19 will result in recorder controller 24 causing the flow through valve 12 to be reduced. By operating in the described continuous manner, it is not required that the exact concentration of the volatile fluid in the non-volatile liquid stream removed from column 10 be determined in order to effectively control the stripping operation in column 10. However, it is within the scope of this invention to calibrate the detector 23 so as to determine the concentration of the volatile fluid accurately.

Although this control method has been described as it relates to the control of the flow of heat to distillation column 10, it is also within the scope of this invention to control the flow of feed to distillation column 10 or the pressure of column 10 in a like manner.

Figure 2:
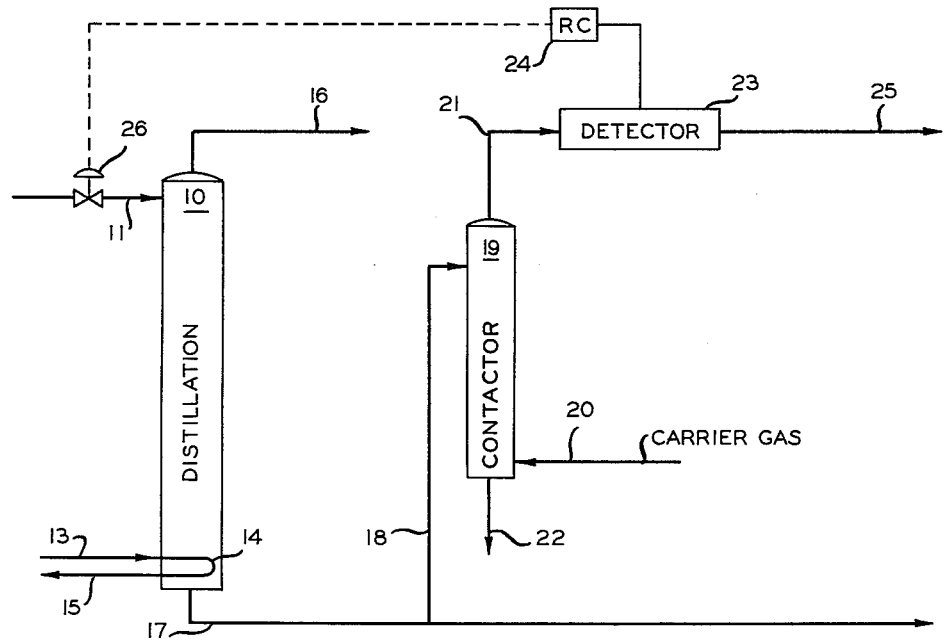
FIGURE 2 is a schematic diagram of another embodiment of the inventive control method.

Referring to FIGURE 2, a method of controlling the flow of feed to distillation column 10 is illustrated. The same numbers are used to denote apparatus having the same function as and identical to the apparatus of FIGURE 1. The output signal of detector 23 is transmitted to recorder controller 24, which in response to said output signal operates to open or close valve 26. With an increase in concentration of volatile fluid in the carrier gas stream flowing from column 19 so as to provide a total volatile fluid concentration above a predetermined value, recorder controller 24 will cause valve 25 to close decreasing the flow of feed to column 10. A volatile fluid concentration below the predetermined value will result in recorder controller 24 causing valve 26 to open, increasing the flow of feed to column 10.

Figure 3:
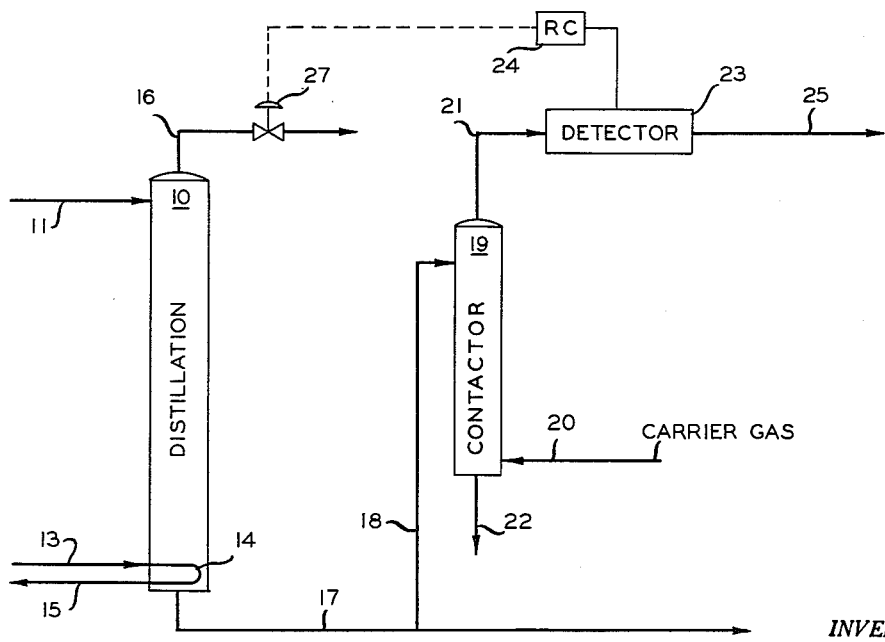
FIGURE 3 is a schematic diagram of yet another embodiment of the inventive control method.

Referring to FIGURE 3, a method of controlling the pressure of column 10 is illustrated. The same numbers are used to denote apparatus having the same function as and identical to the apparatus of FIGURE 1. The output signal of detector 23 is transmitted to recorder controller 24, which in response to said output signal operates to open or close valve 27. In closing valve 27 the pressure in column 10 is increased and by opening valve 27, the pressure in column 10 is decreased. With a concentration of volatile fluid in the carrier gas stream flowing from column 19 above a predetermined value, recorder controller 24 will cause valve 27 to open thus reducing the pressure in column 10. With a concentration of volatile fluid below the predetermined value, recorder controller 24 will cause valve 27 to close.

In order to more fully describe the inventive control method, reference is made to the specific process of stripping previously absorbed $C_4$ hydrocarbons from furfural. Referring again to FIGURE 1, 52,500 gallons per hour of rich furfural containing a concentration of 5 volume percent $C_4$ hydrocarbons is introduced into distillation column 10 via conduit 11. Column 10 is operated at a top temperature of 125° F., a bottom temperature of 315° F., and a column pressure of 60 p.s.i.g.

A lean furfural stream is removed from the bottom of distillation column 10 via conduit 17. From this lean furfural stream, a sample stream at the rate of 3 gallons per hour is continuously introduced into the upper region of contact column 19. Helium as a carrier gas is introduced into the lower region of contact column 19 via conduit 20 at the rate of $\frac{1}{12}$ cubic foot per hour. Column 19 is 8 inches in length with a diameter of ½ inch. The temperature of column 19 is maintained at 105° F.

A gaseous stream is removed from the top of column 19 via conduit 21 and passed to detector 23 wherein the difference in the thermal conductivity of the column effluent and the carrier gas is determined and a signal representative of the difference transmitted to temperature recorder controller 24. Temperature recorder controller 24 causes valve 12 to open or close in the aforementioned manner, in response to the difference in thermal conductivity heretofore determined. In this manner, the flow of steam to column 10 is regulated so as to maintain a concentration of $C_4$ in the lean furfural removed from distillation column 10 via conduit 17 in the range of 0.01 to 0.3 volume percent.

As will be evident to those skilled in the art, various modifications of this invention can be made, or followed in the light of the foregoing disclosure and discussion without departing from the spirit or scope thereof.

I claim:
1. A method of controlling the separation of a volatile fluid from a relatively non-volatile liquid which comprises introducing a relatively non-volatile liquid food containing a volatile fluid into a distillation zone, withdrawing from said distillation zone a volatile fluid, withdrawing from said distillation zone a relatively non-volatile liquid, passing an inert gaseous stream through at least a portion of said withdrawn relatively non-volatile liquid in a contact zone, withdrawing from said contact zone a relatively non-volatile liquid containing a concentration of said volatile fluid less than the concentration of said volatile fluid in said non-volatile liquid passed to said contact zone, withdrawing a gaseous stream effluent from said contact zone containing at least a portion of said volatile fluid contained in said non-volatile liquid passed to said contact zone, measuring a property of said gaseous stream effluent from said contact zone which is representative of the concentration of said volatile fluid contained therein, and controlling the separation of said volatile fluid from said relatively non-volatile liquid in said distillation zone in response to said measured property.

2. A method of controlling the separation of a volatile fluid from a relatively non-volatile liquid which comprises introducing a relatively non-volatile liquid feed containing a volatile fluid into a distillation zone, withdrawing from said distillation zone a volatile fluid, withdrawing from said distillation zone a relatively non-volatile liquid, passing an inert gaseous stream through at least a portion of said withdrawn relatively non-volatile liquid in a contact zone, withdrawing from said contact zone a relatively non-volatile liquid containing a concentration of said volatile fluid less than the concentration of said volatile fluid in said non-volatile liquid passed to said contact zone, withdrawing a gaseous stream effluent from said contact zone containing at least a portion of said volatile fluid contained in said non-volatile liquid passed to said contact zone, measuring a property of said gaseous stream effluent from said contact zone which is representative of the concentration of said volatile fluid contained therein, and controlling the flow of heat to said distillation zone in response to said measured property.

3. A method of controlling the separation of a volatile fluid from a relatively non-volatile liquid which comprises introducing a relatively non-volatile liquid feed containing a volatile fluid into a distillation zone, withdrawing from said distillation zone a volatile fluid, withdrawing from said distillation zone a relatively non-volatile liquid, pasing an inert gaseous stream through at least a portion of said withdrawn relatively non-volatile liquid in a contact zone, withdrawing from said contact zone a relatively non-volatile liquid containing a concentration of said volatile fluid less than the concentration of said volatile fluid in said non-volatile liquid passed said contact zone, withdrawing a gaseous stream effluent from said contact zone containing at least a portion of said volatile fluid contained in said non-volatile liquid passed to said contact zone, measuring a property of said gaseous stream effluent from said contact zone which is representative of the concentration of said volatile fluid contained therein, and controlling the rate of flow of said relatively non-volatile liquid feed to said distillation zone in response to said measured property.

4. A method of controlling the separation of a volatile fluid from a relatively non-volatile liquid which comprises introducing a relatively non-volatile liquid feed containing a volatile fluid into a distillation zone, withdrawing from said distillation zone a volatile fluid, withdrawing from said distillation zone a relatively non-volatile liquid, passing an inert gaseous stream through at least a portion of said withdrawn relatively non-volatile liquid in a contact zone, withdrawing from said zone a relatively non-volatile liquid containing a concentration of said volatile fluid less than the concentration of said volatile fluid in said non-volatile liquid passed to said contact zone, withdrawing a gaseous stream effluent from said contact zone containing at least a portion of said volatile fluid contained in said non-volatile liquid passed to said contact zone, measuring a property of said gaseous stream effluent from said contact zone which is representative of the concentration of said volatile fluid contained therein, and adjusting the pressure of said distillation zone in response to said measured property.

5. A method of controlling the separation of a volatile fluid from a relatively non-volatile liquid which comprises introducing a relatively non-volatile liquid feed containing a volatile fluid into a distillation zone, withdrawing from said distillation zone a volatile fluid, withdrawing from said distillation zone a relatively non-volatile liquid, passing at least a portion of said withdrawn relatively non-volatile liquid into a contact zone, passing into said contact zone an inert gaseous stream, maintaining the temperature of said contact zone substantially constant, withdrawing from said contact zone a relatively non-volatile liquid containing a concentration of said volatile fluid less than the concentration of said volatile fluid in said non-volatile liquid passed to said contact zone, withdrawing from said contact zone a gaseous stream containing at least a portion of said volatile fluid contained in said non-volatile liquid passed to said contact zone, measuring a property of said withdrawn gaseous stream which is representative of the concentration of said volatile fluid contained therein, and controlling the flow of heat to said distillation zone in response to said measured property.

6. A method of controlling the separation of a volatile fluid from a relatively non-volatile liquid which comprises introducing a relatively non volatile liquid feed containing a volatile fluid into a distillation zone, withdrawing from said distillation zone a volatile fluid, withdrawing from said distillation zone a relatively non-volatile liquid, passing at least a portion of said withdrawn relatively non-volatile liquid into a contact zone, passing into said zone an inert gaseous stream, maintaining the temperature of said contact zone substantially constant, withdrawing from said contact zone a relatively non-volatile liquid containing a concentration of said volatile fluid less than the concentration of said volatile fluid in said non-volatile liquid passed to said contact zone, withdrawing from said contact zone a gaseous effluent stream containing at least a portion of said volatile fluid contained in said non-volatile liquid passed said contact zone, measuring a property of said withdrawn gaseous effluent stream which is representative of the concentration of said volatile fluid contained therein, and controlling the rate of flow of said relatively non-volatile feed to said distillation zone in response to said measured property.

7. A method of controlling the separation of a volatile fluid from a relatively non-volatile liquid which comprises introducing a relatively non-volatile liquid feed containing a volatile fluid into a distillation zone, withdrawing from said distillation zone a volatile fluid, withdrawing from said distillation zone a relatively non-volatile liquid, passing at least a portion of said withdrawn relatively non-volatile liquid into a contact zone, passing into said contact zone an inert gaseous stream maintaining the temperature of said contact zone substantially constant, withdrawing from said contact zone a relatively non-volatile liquid containing a concentration of said volatile fluid less than the concentration of said volatile fluid in said non-volatile liquid passed to said contact zone, withdrawing from said contact zone a gaseous effluent stream containing at least a portion of said volatile fluid contained in said non-volatile liquid passed to said contact zone, measuring a property of said withdrawn gaseous stream which is representative of the concentration of said volatile fluid contained therein, and regulating the pressure of said distillation zone in response to said measured property.

8. A method of controlling the separation of absorbed $C_4$ hydrocarbons from furfural which comprises introducing a rich furfural feed containing absorbed $C_4$ hydrocarbons into a distillation zone, withdrawing from said distillation zone a $C_4$ hydrocarbon stream, withdrawing from said distillation zone a lean furfural stream, passing at least a portion of said lean furfural stream into a contact zone, passing an inert gaseous stream into said contact zone maintaining the temperature of said contact zone substantially constant, withdrawing from said contact zone in a lean furfural stream containing a concentration of said absorbed $C_4$ hydrocarbons less than the concentration of said absorbed $C_4$ hydrocarbons in said furfural stream passed to said contact zone, withdrawing from said contact zone a gaseous effluent stream containing at least a portion of said $C_4$ hydrocarbons in the furfural stream passed to said contact zone, measuring the property of said withdrawn gaseous effluent stream which is representative of the concentration of said $C_4$ hydrocarbons contained therein, and controlling the rate of flow of heat to said distillation zone in response to said measured property.

9. The method of claim 8 wherein said gaseous stream is comprised of helium.

10. In the separation of a volatile fluid from a relatively non-volatile liquid apparatus comprising in combination, a distillation column and a contact column; first conduit inlet means communicating with the upper region of said distillation column; second conduit outlet means communicating with the top of said distillation column; third conduit outlet means communicating with the lower region of said distillation column; means of heating said distillation column, said heating means disposed in the lower region of said distillation column; fourth conduit sampling means communicating between said third conduit means and the upper region of said contact column; fifth conduit inlet means communicating with the lower region of said contact column; sixth conduit outlet means communicating between the top of said contact column and a means to measure a property of a gaseous stream which is representative of the composition thereof; seventh conduit outlet means communicating with the bottom of said contact column; and a means of controlling the flow of heat to said heating means in response to said measured property.

11. In the separation of a volatile fluid from a relatively non-volatile liquid apparatus comprising in combination, a distillation column and a contact column; first conduit inlet means communicating with the upper region of said distillation column; second conduit outlet means communicating with the top of said distillation column; third conduit outlet means communicating with the lower region of said distillation column; means of heating said distillation column, said heating means disposed in the lower region of said distillation column; fourth conduit sampling means communicating between said third conduit means and the upper region of said contact column; fifth conduit inlet means communicating with the lower region of said contact column; sixth conduit outlet means communicating between the top of said contact column and a means to measure a property of a gaseous stream which is representative of the composition thereof; seventh conduit outlet means communicating with the bottom of said contact column; and a means of controlling the rate of fluid flow through said first conduit means in response to said measured property.

12. In the separation of a volatile fluid from a relatively non-volatile liquid apparatus comprising in combination, a distillation column and a contact column; first conduit inlet means communicating with the upper region of said distillation column; second conduit outlet means communicating with the top of said distillation column; third conduit outlet means communicating with the lower region of said distillation column; means of heating said distillation column, said heating means disposed in the lower region of said distillation column; fourth conduit sampling means communicating between said third conduit means and the upper region of said contact column; fifth conduit inlet means communicating with the lower region of said contact column; sixth conduit outlet means communicating between the top of said contact column and a means to measure a property of a gaseous stream which is representative of the composition thereof; seventh conduit outlet means communicating with the bottom of said contact column; and a means of controlling the rate of fluid flow through said second conduit outlet means in response to said measured property.

13. A method of determining the concentration of a volatile fluid contained within a relatively non-volatile liquid which comprises introducing a relatively non-volatile liquid feed containing a volatile fluid into a contact zone, passing an inert gaseous stream to said contact zone, withdrawing from said contact zone a relatively non-volatile liquid containing a concentration of said volatile fluid less than the concentration of said volatile fluid in said non-volatile liquid passed to said contact zone, withdrawing a gaseous stream effluent from said contact zone containing at least a portion of said volatile fluid contained in said non-volatile liquid passed to said contact zone, and measuring a property of said gaseous stream effluent from said contact zone which is representative of the concentration of said volatile fluid contained therein.

14. The method of claim 13 wherein said volatile fluid comprises $C_4$ hydrocarbons and said relatively non-volatile liquid comprises furfural.

References Cited in the file of this patent

UNITED STATES PATENTS

| | | |
|---|---|---|
| 2,696,464 | Mathis et al. | Dec. 7, 1954 |
| 2,764,536 | Hutchins | Sept. 25, 1956 |
| 2,835,116 | Miller | May 20, 1958 |
| 2,841,005 | Coggeshall | July 1, 1958 |
| 2,917,437 | Kleiss et al. | Dec. 15, 1959 |